US012726861B2

(12) United States Patent
Wang et al.

(10) Patent No.: US 12,726,861 B2
(45) Date of Patent: Sep. 1, 2026

(54) METHOD, DEVICE AND COMPUTER STORAGE MEDIUM OF COMMUNICATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 18/271,073

(22) PCT Filed: Jan. 8, 2021

(86) PCT No.: PCT/CN2021/070913
§ 371 (c)(1),
(2) Date: Jul. 6, 2023

(87) PCT Pub. No.: WO2022/147776
PCT Pub. Date: Jul. 14, 2022

(65) Prior Publication Data
US 2024/0306048 A1 Sep. 12, 2024

(51) Int. Cl.
*H04W 36/00* (2009.01)
*H04W 76/19* (2018.01)
*H04W 76/20* (2018.01)

(52) U.S. Cl.
CPC ... *H04W 36/0061* (2013.01); *H04W 36/0058* (2018.08); *H04W 76/19* (2018.02); *H04W 76/20* (2018.02); *H04W 36/0083* (2013.01)

(58) Field of Classification Search
None
See application file for complete search history.

(56) References Cited

U.S. PATENT DOCUMENTS

2018/0324651 A1* 11/2018 Tenny ................. H04L 63/0428
2020/0275519 A1* 8/2020 Sharma ................. H04W 12/04
2020/0359282 A1* 11/2020 da Silva .......... H04W 36/00835
2022/0086704 A1* 3/2022 Futaki ................... H04W 36/36
2022/0248294 A1* 8/2022 Zhang .................. H04W 76/30
(Continued)

FOREIGN PATENT DOCUMENTS

CN 110545567 A 12/2019
JP 2023-528975 A 7/2023
(Continued)

OTHER PUBLICATIONS

Ericsson, Summary of AI 8.13.2.3—Other WID related SON features, 3GPP TSG-RAN WG2 #111-e, Agenda Item 8.13.2.3, R2-2010996, pp. 1-34, Nov. 2-13, 2020 (Year: 2020).*
(Continued)

*Primary Examiner* — Benjamin Lamont
(74) *Attorney, Agent, or Firm* — Sughrue Mion, PLLC

(57) ABSTRACT

Embodiments of the present disclosure relate to methods, devices and computer readable media for communication. A network device transmits, to a terminal device, a configuration regarding a storing of information concerning a change of a primary cell of a secondary node, the network device being the secondary node or a master node. Based on the configuration, the terminal device stores the information concerning the change of the primary cell of the secondary node. In this way, a very flexible reporting of the change of the primary cell of the secondary node can be achieved.

30 Claims, 5 Drawing Sheets

(56) References Cited

U.S. PATENT DOCUMENTS

2022/0256411 A1* 8/2022 Liu ................. H04W 36/00698
2022/0369173 A1* 11/2022 Deng .............. H04W 36/00692
2022/0394620 A1* 12/2022 Hu ...................... H04W 28/082
2023/0097891 A1* 3/2023 Zhang ............. H04W 36/00837 370/331
2023/0217335 A1* 7/2023 Xie ................... H04W 36/0058 370/331
2023/0300691 A1* 9/2023 Eklöf ................ H04W 36/0061 370/331

FOREIGN PATENT DOCUMENTS

WO 2018/201985 A1 11/2018
WO 2019/066628 A1 4/2019
WO 2020/144919 A1 7/2020
WO 2020/259435 A1 12/2020
WO 2021/249431 A1 12/2021
WO 2022/147776 A1 7/2022

OTHER PUBLICATIONS

NEC, "Applicability of CHO agreements to conditional PSCell change", 3GPP TSG-RAN WG2 #107bis, R2-1912983, Oct. 14-18, 2019, pp. 1-11, Chongqing, China.

CATT, "Introduction of CPA and MN Initiated Inter-SN CPC", 3GPP TSG-RAN WG2 Meeting #112 electronic, R2-2009359, Nov. 2-13, 2020, pp. 1-16.

International Search Report of PCT/CN2021/070913 dated Oct. 9, 2021 [PCT/ISA/210].

Written Opinion of PCT/CN2021/070913 dated Oct. 9, 2021 [PCT/ISA/237].

Ericsson, "Summary of AI 8.13.2.3- Other WID related SON features", 3GPP TSG-RAN WG2 #111-e, R2-2010996, Nov. 2-13, 2020 (20 pages total).

NTTDocomo, Inc., "Discussion on collection of UE history information in EN-DC", 3GPP TSG-RAN WG2 #112-e, R2-2010508, Nov. 2-13, 2020 (2 pages total).

NTTDocomo, Inc., "Discussion on successful handover report", 3GPP TSG-RAN WG2 #112-e, R2-2010459, Nov. 2-13, 2020 (4 pages total).

Communication issued Dec. 10, 2024 in Japanese Application No. 2023-541550.

Extended European Search Report dated Jul. 4, 2025 in Application No. 21916832.5.

Japanese Office Action dated May 20, 2025 in Application No. 2023-541550.

Communication dated Oct. 21, 2025 in Japanese Application No. 2023-541550.

* cited by examiner

METHOD, DEVICE AND COMPUTER STORAGE MEDIUM OF COMMUNICATION

CROSS REFERENCE TO RELATED APPLICATIONS

This application is a National Stage of International Application No. PCT/CN2021/070913, filed Jan. 8, 2021.

TECHNICAL FIELD

Embodiments of the present disclosure generally relate to the field of telecommunication, and in particular, to methods, devices and computer storage media of communication for a reporting of a successful change of a primary cell (PSCell) of a secondary node (SN).

BACKGROUND

In third generation partnership project (3GPP) Release 17, data collection for self-organized network (SON) and minimization drive test (MDT) in new radio (NR) needs to be enhanced. Among others, SON features include successful handovers reports and user equipment (UE) history information in EUTRA-NR dual connection (EN-DC).

In 3GPP history, many features introduced to enhance performance of a master node (MN) will also be introduced to SN. For example, conditional handover (CHO)/conditional PSCell change (CPC), mobility history information (MHI)/MHI for secondary cell group (SCG) or the like. Applying MN features to SN will also bring identical benefit to SN related performance. In this event, introducing a successful handover report to SN needs to be studied.

SUMMARY

In general, embodiments of the present disclosure provide methods, devices and computer storage media of communication for a reporting of a successful PSCell change.

In a first aspect, there is provided a method of communication. The method comprises: receiving, at a terminal device and from a network device, a configuration regarding a storing of information concerning a change of a primary cell of a secondary node, the network device being the secondary node or a master node; and storing, based on the configuration, the information concerning the change of the primary cell of the secondary node.

In a second aspect, there is provided a method of communication. The method comprises: transmitting, at a network device and to a terminal device, a configuration regarding a storing of information concerning a change of a primary cell of a secondary node, the network device being the secondary node or a master node.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the third aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
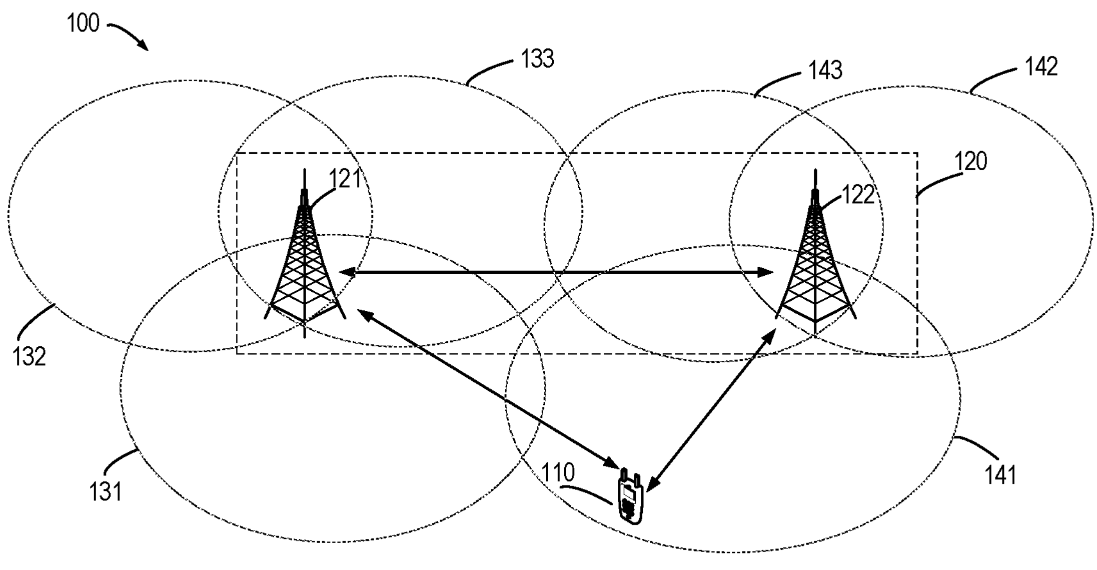
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, UE, personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device or the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, in Release 17, data collection for SON and MDT in NR needs to be enhanced. SON features include coverage and capacity optimization (CCO), inter-system inter-radio access technology (RAT) energy saving, 2-step random access channel (RACH) optimization, mobility enhancement optimization, physical cell identifier (PCI) selection, energy efficiency (operation administration and maintenance (OAM) requirements), successful handovers reports, and UE history information in EN-DC. Meanwhile, some features introduced to enhance performance of a MN are also expected to be introduced to a SN to improve performance of the SN.

In view of the above, embodiments of the present disclosure provide a solution for reporting a successful PSCell change. In the solution, a configuration regarding a storing of information concerning a PSCell change is indicated to a terminal device for storage of the information concerning the PSCell change. In this way, a reporting of a successful PSCell change can be facilitated. Principles and implementations of the present disclosure will be described in detail below with reference to the figures.

Example of Communication Network

FIG. 1 illustrates a schematic diagram of an example communication scenario 100 in which embodiments of the present disclosure can be implemented. As shown in FIG. 1, the communication scenario 100 may involve a terminal device 110, a SN 121 and a MN 122, and the SN 121 and the MN 122 are network devices serving the terminal device 110. The terminal device 110 can establish a dual connection (i.e., simultaneous connection) with the SN 121 and the MN 122. For convenience, in the context of the present application, the SN 121 and the MN 122 are also collectively referred to as a network device 120 hereinafter.

The SN 121 may communicate with the terminal device 110 via a channel such as a wireless communication channel. Similarly, the MN 122 may also communicate with the terminal device 110 via a channel such as a wireless communication channel. The SN 121 may communicate with the MN 122 via a control-plane interface such as Xn-C. The MN 122 may communicate with a core network (not shown) such as an access management function (AMF) via a control-plane interface such as NG-C. The SN 121 may also communicate with the MN 122 via a user plane interface such as Xn-U, and communicate with the core network such as a user port function (UPF) via a user plane interface such as NG-U.

It is to be understood that the number of devices in FIG. 1 is given for the purpose of illustration without suggesting any limitations to the present disclosure. The communication scenario 100 may involve any suitable number of network devices and/or terminal devices adapted for implementing implementations of the present disclosure.

The communications in the communication scenario 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, the sixth generation (6G) communication protocols or beyond.

As shown in FIG. 1, the SN 121 may provide cells 131, 132 and 133 for the terminal device 110. Thus, the cells 131, 132 and 133 form a SCG for the terminal device 110. The MN 122 may provide cells 141, 142 and 143 for the terminal device 110. In this case, the cells 141, 142 and 143 form a master cell group (MCG) for the terminal device 110. It should be noted that the number of the cells in the SCG and that in the MCG are not limited to three, and more or less cells are also configured for the terminal device 110. For convenience, assuming that cells 131, 132 and 133 in the SCG and cells 141, 142 and 143 in the MCG are configured to the terminal device 110. The cell 131 is a primary cell of the SCG (also referred to as PSCell) and the cell 141 is a primary cell of the MCG (also referred to as PCell).

In some scenarios, the PSCell may be changed from the cell 131 to another cell. In some embodiments, the other cell may be a cell in current SN, for example, the cell 132 or 133. Of course, any other suitable cell in the other network device is also feasible. In this case, the SN may be changed from a source SN to a target SN, and the target SN may be the same or different from the source SN. For convenience, the following description is made by taking the cell 132 as an example of the other cell. In this case, both the source SN and the target SN is the SN 121.

The present inventor notes that the mobility robustness optimization (MRO) function in NR could be enhanced to provide a more robust mobility via reporting failure events observed during successful PScell change. Upon reception of the reporting, the receiving node is able to analyze whether its mobility configuration needs adjustment. In this way, network performance can be optimized. In this context, a reporting of a successful PSCell change also needs to be studied.

Example Implementation of Reporting a Successful PSCell Change

According to embodiments of the present application, information concerning a PSCell change can be stored based on a configuration regarding the storing of the information and then reported to the network side (for example, the network device 120) as needed. In this way, a reporting of a successful PSCell change can be facilitated and network performance can be improved. More details will be described with reference to FIG. 2.

Figure 2:
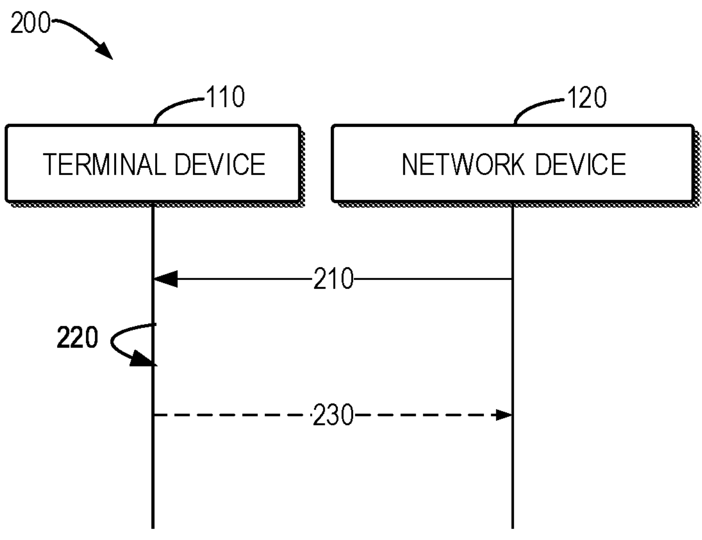
FIG. 2 illustrates a schematic diagram illustrating a process for reporting a successful PSCell change according to embodiments of the present disclosure.

FIG. 2 illustrates a schematic diagram illustrating a process 200 for reporting a successful PSCell change according to embodiments of the present disclosure. For the purpose of discussion, the process 200 will be described with reference to FIG. 1. The process 200 may involve the terminal device 110 and the network device 120 as illustrated in FIG. 1. The network device 120 may be the secondary node 121 or the master node 122 serving the terminal device 110.

As shown in FIG. 2, the network device 120 may transmit 210, to the terminal device 110, a configuration regarding a storing of information concerning a change of a primary cell of the SN 121 (also referred to as a PSCell change herein). In some embodiments, the configuration may indicate whether the storing of the information concerning the PSCell change is supported. In other words, the network device can configure if a successful PSCell change report (SPCR) is supported. In some embodiments, the configuration may comprise one or more conditions for triggering the storing of the information. In other words, the network device can configure the conditions for triggering the SPCR. It should be noted that the condition can be set in any suitable ways, and the present disclosure does not make limitation for this. In this way, the support of SPCR is under network control.

In some embodiments, the MN 122 and the SN 121 may configure the successful PSCell change report (may also referred to as SPCR configuration herein) separately. In some embodiments, the network device 120 may be the MN 122. In these embodiments, the MN 122 may transmit the configuration in a radio resource control (RRC) message. Alternatively, the MN 122 may transmit the configuration in system information. Of course, any other suitable means are also feasible. In some embodiments, the MN 122 may transmit the configuration in case that the PSCell change is initiated by the MN 122.

For example, the MN 122 may send a SPCR configuration to the SN 121, and the SN 121 may contain the SPCR configuration in a SN RRC reconfiguration message, and send the SN RRC reconfiguration message to the MN 122. The MN 122 may transmit a RRC reconfiguration message including the SN RRC reconfiguration message with the SPCR configuration. As another example, the MN may transmit a MN RRC reconfiguration message with SPCR configuration to the terminal device 110.

In some embodiments, the network device 120 may be the SN 121. In these embodiments, the SN 121 may transmit the configuration in a RRC message. Of course, any other suitable means are also feasible. In some embodiments, the SN 121 may transmit the configuration in case that the PSCell change is initiated by the SN 121. For example, the SN 121 may transmit a SN RRCReconfiguration message with the SPCR configuration to the MN 122, and the MN 122 may transmit a MN RRCReconfiguration message comprising the SN RRCReconfiguration message to the terminal device 110. As another example, in case that SRB3 is configured for the terminal device 110, the SN 121 may transmit a SN RRCReconfiguration message with the SPCR configuration to the terminal device 110 directly.

Upon receipt of the configuration regarding the storing of the information concerning the PSCell change, the terminal device 110 may store 220 the information (may also referred to as SPCR information herein) based on the configuration. In some embodiments, the terminal device 110 may be configured with SPCR configuration for MN-initiated PSCell change or SPCR for SN-initiated PSCell change. In some embodiments, the terminal device 110 may determine whether a condition for triggering the storing of the information is satisfied. If determining that the condition is satisfied, the terminal device 110 may store or collect contents corresponding to the condition as the information. In this way, signaling overhead and UE storage resource can be reduced.

In some embodiments, the condition may comprise a radio link problem of a source PSCell (also referred to as a first cell herein) of the PSCell change. For example, the radio link problem may comprise at least one of the following events: T310/T312 is running; radio link control (RLC) retransmission is ongoing; beam failure is detected; or consistent listen before talk (LBT) failure is detected. In this case, the terminal device 110 may collect the corresponding contents of the information.

In some embodiments, if the condition of radio link problem is satisfied, the terminal device 110 may store radio link problem related parameters of the source PSCell. For example, T310/T312 value, RLC retransmission times, beam failure related information, consistent LBT failure related information. In some embodiments, the terminal device 110 may store the measurement result of the source PSCell, a target PSCell (also referred to as a second cell herein) and neighboring cells when the condition is satisfied. In some embodiments, the terminal device 110 may store an identity (ID) of the source PSCell and an ID of the target PSCell. In some embodiments, the terminal may store identity (ID) of the PCell (primary cell of MN) when the PSCell change initiated. In some embodiments, the PCell ID is only reported in case of MN-initiated PSCell change. In some embodiments the terminal device 110 may store an identifier of the terminal device 110 in the source PSCell and the PCell. For example, the identifier may be a cell-radio network temporary identifier (C-RNTI) or the like. In some embodiments, the Identifier of the terminal device 110 in the PCell is only reported in case of MN-initiated PSCell change.

In some embodiments, upon execution of CPC, the condition may comprise whether a plurality of candidate cells are configured for the target PSCell. In some embodiments, if the plurality of candidate cells are configured, the terminal device 110 may store at least one of the following: IDs of the plurality of candidate cells, measurement results of the plurality of candidate cells, or execution conditions of the plurality of candidate cells.

In some embodiments, upon execution of CPC, the condition may comprise whether the plurality of execution conditions are configured for the target PSCell. In some embodiments, if the plurality of execution conditions are configured, the terminal device 110 may store the satisfied execution condition. For example, measId, event ID, trigger threshold, trigger offset, hysteresis value, timToTrigger value. It is to be understood that these are merely examples, any other suitable contents for the information are also feasible.

In some embodiments, the condition may be predefined. In some alternative embodiments, the condition may be indicated dynamically. For example, the condition may be indicated in the configuration regarding the storing of the information. In this case, the terminal device 110 may obtain the condition from the configuration. In some embodiments, the indicated condition may be a portion of the predefined condition.

In some embodiments, SPCR information may be stored in an information element (IE), for example, a UE variable. In some embodiments, SPCR information corresponding to multiple PSCell change events may be stored respectively. In some embodiments, SPCR information may be stored with MN-initiated and SN-initiated PSCell change differentiated.

In some embodiments, the terminal device 110 may store SPCR information for MN-initiate PSCell change and SN initiate PSCell change separately. In some embodiments, if the PSCell change is initiated by the SN 121, the terminal device 110 may store the information in a first IE of the terminal device 110, and if the PSCell change is initiated by the MN 122, the terminal device 110 may store the information in a second IE of the terminal device 110. For example, the information associated with SN-initiated PScell change and the information associated with MN-initiated PSCell change may be stored in different UE variables.

In some alternative embodiments, the terminal device 110 may add an explicit indication that if the SPCR information is for MN initiated PSCell change or SN initiated PSCell change. In some embodiments, if the PSCell change is initiated by the SN 121, the terminal device 110 may store the information in association with a first indication indicating that the information is associated with the PSCell change initiated by the SN 121. If the PSCell change is initiated by the MN 122, the terminal device 110 may store the information in association with a second indication indicating that the information is associated with the PSCell change initiated by the MN 122.

After storage of the information, the terminal device 110 may transmit 230 the information to the network device 120. In other words, the SPCR information is reported to the network side. In some embodiments, the terminal device 110 may transmit availability of the information to the network device 120. Upon receipt of the availability, the network device 120 may transmit a request for obtaining the information to the terminal device 110. In response to receiving the request, the terminal device 110 may transmit the requested information to the network device 120. The information may be associated with the SN-initiated change, the MN-initiated change, or both. More detailed description of will be made in connection with Embodiments 1-3 below.

Embodiment 1

In this embodiment, the terminal device 110 reports availability of the SPCR information to the MN 122 and transmits the SPCR information to the MN 122 upon receipt of a request for the SPCR information from the MN 122. This will be described with reference to FIG. 3.

Figure 3:
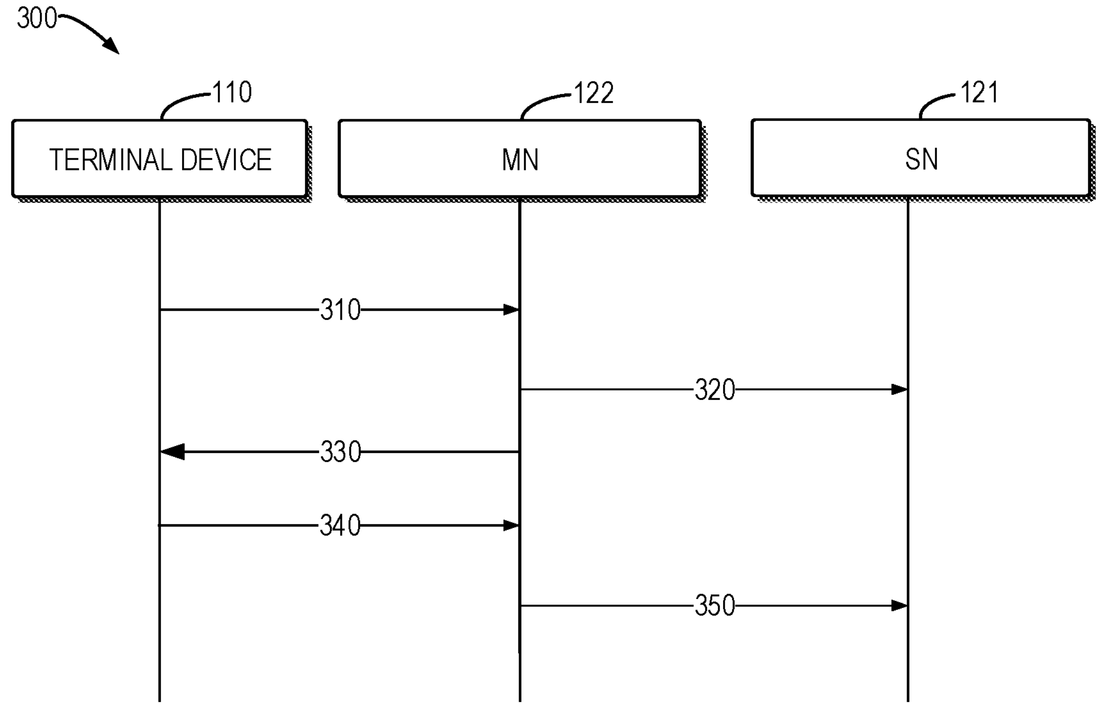
FIG. 3 illustrates a schematic diagram illustrating another process for reporting a successful PSCell change according to embodiments of the present disclosure.

FIG. 3 illustrates a schematic diagram illustrating another process 300 for reporting a successful PSCell change according to embodiments of the present disclosure. For the purpose of discussion, the process 300 will be described with reference to FIG. 1. The process 300 may involve the terminal device 110, the MN 122 and the SN 121 as illustrated in FIG. 1.

As shown in FIG. 3, the terminal device 110 may transmit 310 availability of SPCR information to the MN 122. In some embodiments, if the terminal device 110 has stored SPCR information, the terminal device 110 may add availability of the SPCR information (also referred to as SPCR availability herein) in a MN RRC message such as a RRCReconfigurationComplete message. This can be applied to any of the following cases but not limited to: MN-initiated intra-SN or inter-SN PSCell change, SN-initiated intra-SN PSCell change with MN involvement, SN-initiated inter-SN PSCell change, or SN-initiated intra-SN PSCell change without MN involvement when SRB3 is not used.

In some alternative embodiments, if the SPCR information is associated with the MN-initiated PSCell change, the terminal device 110 may transmit the availability of the SPCR information to the MN 122. For example, if the terminal device 110 has stored SPCR information associated with MN-initiated PSCell change, the terminal device 110 may add availability of SPCR information in a MN RRC message such as a MN RRCReconfigurationComplete message. Of course, any other suitable messages are also feasible.

In some alternative embodiments, if the SPCR information is associated with the MN-initiated change, the terminal device 110 may transmit, to the MN 122, the availability of the SPCR information associated with the MN-initiated PSCell change. If the SPCR information is associated with the SN-initiated change, the terminal device 110 may transmit, to the MN 122, the availability of the SPCR information associated with the SN-initiated PSCell change. In this way, the terminal device 110 can indicate availability of SPCR for MN-initiated PSCell change and SN-initiated PSCell change to the MN 122 separately.

In some embodiments, upon receipt of the availability of SPCR information associated with SN-initiated PSCell change, the MN 122 may forward 320 the availability of SPCR information associated with SN-initiated PSCell change to the target SN (in this example, the SN 121). In this way, the SN 121 may initiate the fetch of the SPCR information associated with SN-initiated PSCell change from the terminal device 110.

Upon receipt of the availability of SPCR information, the MN 122 may transmit 330 a request for the SPCR information to the terminal device 110. For example, the MN 122 may transmit the request by a UEInformationRequest message. Of course, any other suitable messages are also feasible.

In some embodiments, the MN 122 may transmit a request for first part of the information associated with the SN-initiated PSCell change. In some alternative embodiments, the MN 122 may transmit a request for second part of the information associated with the MN-initiated PSCell change. In this way, the MN 122 can request for the SPCR information associated with MN-initiated PSCell change or SN-initiated PSCell change separately.

In some alternative embodiments, the MN 122 may only transmit the request for the SPCR information associated with MN-initiated PSCell change and forward availability of SPCR information associated with SN-initiated PSCell change to the SN 121 to let the SN 121 initiate the fetch of the SPCR information associated with SN-initiated PSCell change. The fetch of the SPCR information associated with SN-initiated PSCell change by the SN 121 can be carried out as described in Embodiment 2 or 3 below.

Upon receipt of the request, the terminal device 110 may transmit 340 the SPCR information to the MN 122. For example, the terminal device 110 may report the SPCR information by a UEInformationResponse message. Of course, any other suitable messages are also feasible.

In some embodiments, the terminal device 110 may report SPCR information associated with both MN-initiated PSCell change and SN-initiated PSCell change to the MN 122. In some embodiments, the MN 122 may forward 350 the SPCP information associated with SN-initiated PSCell change to the source SN (in this example, the SN 121).

In some alternative embodiments, the terminal device 110 may report only SPCR information associated with MN-initiated PSCell change to the MN 122.

In some alternative embodiments, in response to receiving the request for the first part of the information associated with the SN-initiated change from the MN 122, the terminal device 110 may transmit the first part of the information (i.e., SPCR information associated with SN-initiated PSCell change) to the MN 122. In some alternative embodiments, in response to receiving the request for the second part of the information associated with the MN-initiated change from the MN 122, the terminal device 110 may transmit the second part of the information (i.e., SPCR information associated with SN-initiated PSCell change) to the MN 122. In this way, the terminal device 110 can report SPCR information associated with MN-initiated PSCell change or SN-initiated PSCell change as per the request from the MN 122.

Embodiment 2

In this embodiment, the terminal device 110 reports availability of the SPCR information to the target SN (in this example, the SN 121) by SRB3 and transmits the SPCR information to the target SN by SRB3 upon receipt of a request for the SPCR information from the SN 121. In some embodiments where the target SN and the source SN are different network devices, the target SN may forward the SPCR associated with SN-initiated PSCell change to the source SN by SRB3. This will be described with reference to FIG. 4.

Figure 4:
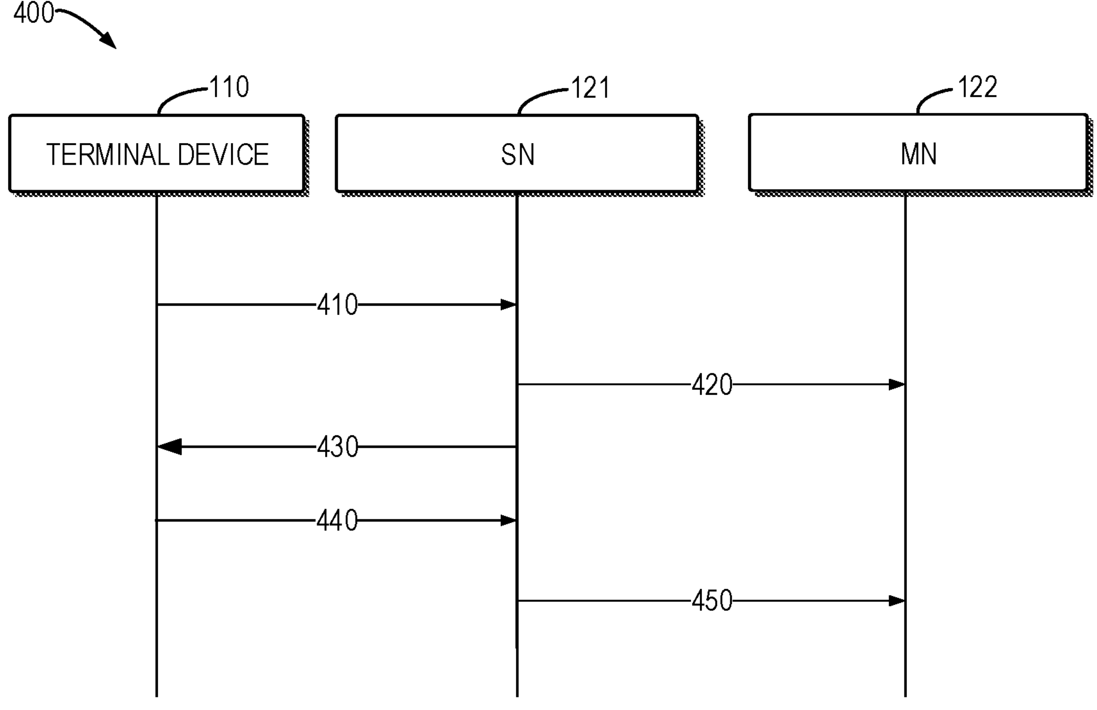
FIG. 4 illustrates a schematic diagram illustrating still another process for reporting a successful PSCell change according to embodiments of the present disclosure.

FIG. 4 illustrates a schematic diagram illustrating another process 400 for reporting a successful PSCell change according to embodiments of the present disclosure. For the purpose of discussion, the process 400 will be described with reference to FIG. 1. The process 400 may involve the terminal device 110, the MN 122 and the SN 121 as illustrated in FIG. 1.

As shown in FIG. 4, the terminal device 110 may transmit 410 availability of SPCR information to the SN 121. For example, the terminal device 110 may transmit the availability of SPCR information n SN RRC message such as a RRCReconfigurationComplete message by SRB3. It is to be understood that any other suitable messages are also feasible.

In some embodiments, if the terminal device 110 has stored SPCR information, the terminal device 110 may add availability of SPCR information in a SN RRC message such as a RRCReconfigurationComplete message in case of SN-initiated PSCell change without MN involvement and SRB3 is used.

In some alternative embodiments, if the SPCR information is associated with the SN-initiated change, the terminal device 110 may transmit the availability of the SPCR information to the SN 121. For example, if the terminal device 110 has stored SPCR information associated with SN-initiated PSCell change, the terminal device 110 may add availability of SPCR information in a SN RRC message such as a SN RRCReconfigurationComplete message. Of course, any other suitable messages are also feasible.

In some alternative embodiments, if the SPCR information is associated with the MN-initiated change, the terminal device 110 may transmit, to the SN 121, the availability of SPCR information associated with the MN-initiated PSCell change. If the SPCR information is associated with the SN-initiated PSCell change, the terminal device 110 may transmit, to the SN 121, the availability of SPCR information associated with the SN-initiated PSCell change. In this way, the terminal device 110 can indicate the availability of SPCR information associated with the MN-initiated PSCell change and the availability of SPCR information associated with the SN-initiated PSCell change to the SN 121 separately.

In some embodiments, upon receipt of the availability of SPCR information associated with MN-initiated PSCell change, the SN 121 may forward 420 the availability of SPCR information associated with MN-initiated PSCell change to the MN 122. In this way, the MN 122 may initiate the fetch of the SPCR information associated with MN-initiated PSCell change from the terminal device 110 as described in Embodiment 1.

Upon receipt of the availability of SPCR information, the SN 121 may transmit 430 a request for the SPCR information to the terminal device 110. For example, the SN 121 may transmit the request by a UEInformationRequest message using SRB3. Of course, any other suitable messages are also feasible.

In some embodiments, the SN 121 may transmit a request for first part of the information associated with the SN-initiated change. In some alternative embodiments, the SN 121 may transmit a request for second part of the information associated with the MN-initiated change. In this way, the SN 121 can request for the SPCR information associated with MN-initiated PSCell change or SPCR information associated with SN-initiated PSCell change or both separately.

In some alternative embodiments, the SN 121 may only transmit the request for the SPCR information associated with SN-initiated PSCell change, and forward availability of SPCR information associated with MN-initiated PSCell change to the MN 122 to let the MN 122 initiate the fetch of the SPCR information associated with MN-initiated PSCell change.

Upon receipt of the request, the terminal device 110 may transmit 440 the SPCR information to the SN 121. For example, the terminal device 110 may report the SPCR information by a UEInformationResponse message using SRB3. Of course, any other suitable messages are also feasible.

In some embodiments, the terminal device 110 may report both SPCR information associated with MN-initiated PSCell change and SPCR information associated with SN-initiated PSCell change to the SN 121. In some embodiments, the SN 121 may forward 450 the SPCR information associated with MN-initiated PSCell change to the MN 122.

In some alternative embodiments, if the information is associated with the SN-initiated change, the terminal device 110 may transmit the information to the SN 121 by SRB3. In other words, the terminal device 110 may report only SPCR information associated with SN-initiated PSCell change to the SN 121.

In some alternative embodiments, in response to receiving the request for the first part of the information associated with the SN-initiated change from the SN 121, the terminal device 110 may transmit the first part of the information (i.e., SPCR information associated with SN-initiated PSCell change) to the SN 121. In some alternative embodiments, in response to receiving the request for the second part of the information associated with the MN-initiated change from the SN 121, the terminal device 110 may transmit the second part of the information (i.e., SPCR information associated with MN-initiated PSCell change) to the SN 121. In this way, the terminal device 110 can report MN-initiated and/or SPCR information associated with SN-initiated PSCell change as per the request from the SN 121.

Embodiment 3

In this embodiment, the terminal device 110 reports availability of the SPCR information to the target SN (in this example, SN 121) by SRB1 (i.e., via the MN 122) and transmits the SPCR information to the target SN by SRB1 upon receipt of a request for the SPCR information from the SN 121 by SRB1. In some embodiments where the target SN and the source SN are different network devices, the target SN may forward the SPCR associated with SN-initiated PSCell change to the source SN via the MN 122 by SRB1. This will be described with reference to FIG. 5.

Figure 5:
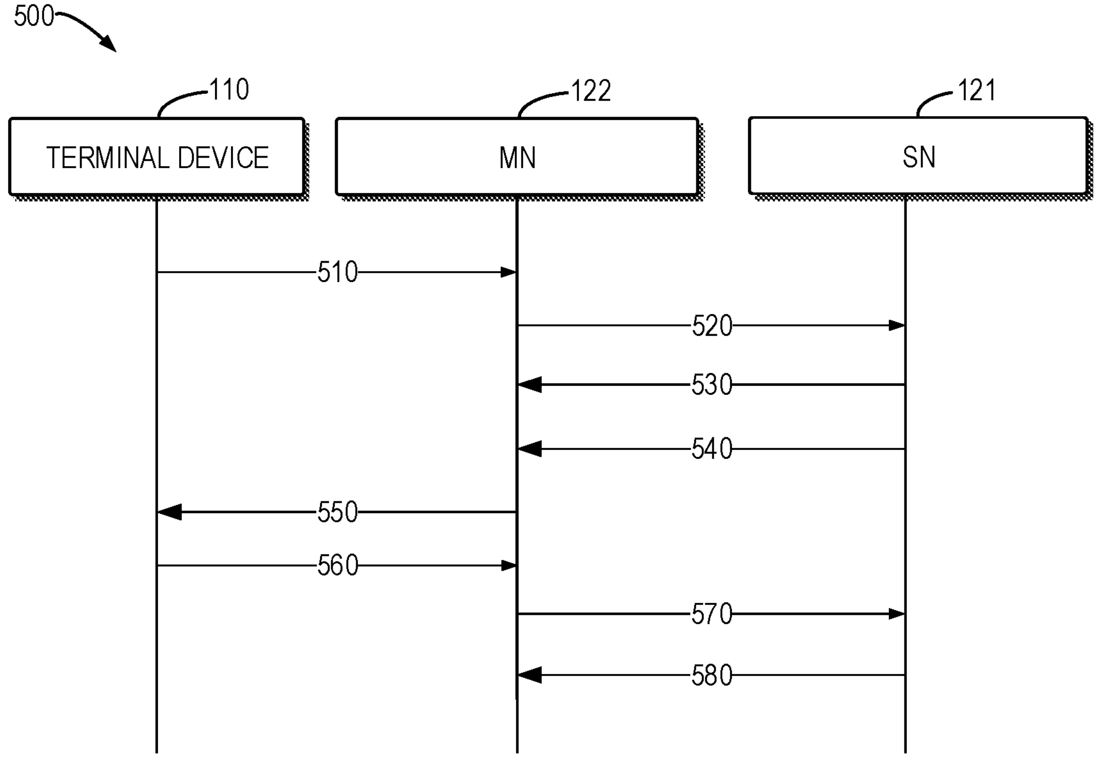
FIG. 5 illustrates a schematic diagram illustrating yet another process for reporting a successful PSCell change according to embodiments of the present disclosure.

FIG. 5 illustrates a schematic diagram illustrating another process 500 for reporting a successful PSCell change according to embodiments of the present disclosure. For the purpose of discussion, the process 500 will be described with reference to FIG. 1. The process 500 may involve the terminal device 110, the MN 122 and the SN 121 as illustrated in FIG. 1.

As shown in FIG. 5, the terminal device 110 may transmit 510 availability of SPCR information to the MN 122 and the MN 122 may forward 520 the availability of SPCR information to the SN 121. For example, the terminal device 110 may report availability of SPCR information in SN RRC message comprised in uplink (UL) MN RRC message.

In some embodiments, if the terminal device 110 has stored SPCR information, the terminal device 110 may add availability of SPCR information in a SN RRC message (such as a SN RRCReconfigurationComplete message) comprised in MN RRC message (such as RRCReconfigurationComplete or ULInformationTransferMRDC message), for example, in case of SN-initiated PSCell change without MN involvement and when SRB3 is not configured. It should be noted that the above-listed messages are merely examples, and any other suitable messages are also feasible.

In some alternative embodiments, if the SPCR information is associated with the SN-initiated change, the terminal device 110 may transmit the availability of the SPCR information to the SN 121. For example, if the terminal device 110 has stored SPCR information associated with SN-initiated PSCell change, the terminal device 110 may report the Availability of SPCR information.

In some alternative embodiments, if the SPCR information is associated with the MN-initiated change, the terminal device 110 may transmit, to the SN 121, the availability of the SPCR information associated with the MN-initiated change (also referred to first part of the SPCR information). If the SPCR information is associated with the SN-initiated change, the terminal device 110 may transmit, to the SN 121, the availability of the SPCR information associated with the SN-initiated change (also referred to second part of the SPCR information). In this way, the terminal device 110 can report availability of SPCR information associated with MN-initiated PSCell change and availability of SPCR information associated with SN-initiated PSCell change to the SN 121 separately.

In some embodiments, upon receipt of the availability of SPCR information, if SRB3 is configured, the SN 121 can initiate the fetch of the SPCR information associated terminal device 110 as described in Embodiment 2.

In some embodiments, upon receipt of the availability of SPCR information, the SN 121 may forward 530 the availability of SPCR information to the MN 122. In this way, the MN 122 may initiate the fetch of the SPCR information associated terminal device 110 as described in Embodiment 1.

In some embodiments, upon receipt of the availability of SPCR information associated with MN-initiated PSCell change, the SN 121 may forward 530 the availability of SPCR information associated with MN-initiated PSCell change to the MN 122. In this way, the MN 122 may initiate the fetch of the SPCR information associated with MN-initiated PSCell change from the terminal device 110 as described in Embodiment 1.

Upon receipt of the availability of SPCR information, the SN 121 may transmit 540 a request for the SPCR information to the MN 122 and the MN 122 may forward 550 the request to the terminal device 110. For example, the SN 121 may transmit the request by a SN UEInformationRequest message. Of course, any other suitable messages are also feasible.

In some embodiments, the SN 121 may transmit a request for first part of the information associated with the MN-initiated change. In some alternative embodiments, the SN 121 may transmit a request for second part of the information associated with the SN-initiated change. In this way, the SN 121 can request for the SPCR information associated with MN-initiated PSCell change or SPCR information associated with SN-initiated PSCell change or both separately.

In some alternative embodiments, the SN 121 may only transmit the request for the SPCR information associated with SN-initiated PSCell change, and forward availability of SPCR information associated with MN-initiated PSCell change to the MN 122 to let the MN 122 initiate the fetch of the SPCR information associated with MN-initiated PSCell change.

Upon receipt of the request, the terminal device 110 may transmit 560 the SPCR information to the MN 122 and the MN 122 may forward 570 the SPCR information to the SN 121. For example, the terminal device 110 may report the SPCR information by a SN UEInformationResponse message comprised in MN RRC message such as a ULInformationTransferMRDC message. Of course, any other suitable messages are also feasible.

In some embodiments, the terminal device 110 may report both MN-initiated and SPCR information associated with SN-initiated PSCell change to the SN 121 via the MN 122. In some embodiments, the SN 121 may forward 580 the MN initiated SPCP information to the MN 122.

In some alternative embodiments, if the information is associated with the SN-initiated change, the terminal device 110 may transmit the information to the SN 121 via the MN 122. In other words, the terminal device 110 may report only SPCR information associated with SN-initiated PSCell change to the SN 121 via the MN 122.

In some alternative embodiments, in response to receiving the request for the first part of the information associated with the SN-initiated change from the SN 121 via the MN 122, the terminal device 110 may transmit the first part of the information (i.e., SPCR information associated with SN-initiated PSCell change) to the SN 121 via the MN 122. In some alternative embodiments, in response to receiving the request for the second part of the information associated with the MN-initiated change from the SN 121 via the MN 122, the terminal device 110 may transmit the second part of the information (i.e., SPCR information associated with MN-initiated PSCell change) to the SN 121 via the MN 122. In this way, the terminal device 110 can report MN-initiated and/or SPCR information associated with SN-initiated PSCell change as per the request from the SN 121. Thus, a very flexible SPCR reporting mechanism is provided.

In some scenarios, the MN 122 may be changed from the current network device to a further network device. For example, the RRC connection for terminal device 110 may be established or reestablished to the further network device, or the UE is handover to the further network device. In this case, the further network device and the current network device are the same network device. As another example, the MN 122 may be handed over from the current network device to the further network device. In this case, the further network device and the current network device are different network devices.

In some embodiments, upon establishment or reestablishment or handover of the MN 122, the terminal device 110 may transmit availability of SPCR information to the further network device. In some embodiments, the terminal device 110 may indicate availability of SPCR information associated with MN-initiated PSCell change and availability of SPCR information associated with SN-initiated PSCell change separately. For example, the terminal device 110 may indicate the availability of SPCR information to the further network device in at least one of the following messages: a RRCSetupComplete message, a RRCResumeComplete message, a RRCRestablishmentComplete message, or a RRCReconfigurationComplete message.

In some embodiments, upon receipt of the availability of SPCR information, the further network device may transmit a request for obtaining the SPCR information to the terminal device 110, for example, by a UEInformationRequest message. Accordingly, the terminal device 110 may transmit the requested SPCR information to the further network device, for example, by a UEInformationResponse message. It is to be understood that the mentioned messages are merely examples and any other suitable messages are also feasible.

In some embodiments, the further network device may forward the SPCR information associated with MN-initiated PSCell change to the MN 122 of the successful PSCell change procedure. In some embodiments where there is an interface between the further network device and the source PSCell, the further network device may forward the SPCR information associated with SN-initiated PSCell change to the SN 121. In some embodiments where there is no interface between the further network device and the source PSCell, the further network device may forward the SPCR information associated with SN-initiated PSCell change to the MN 122 of the successful PSCell change procedure, to let the MN 122 to forward the SPCR information associated with SN-initiated PSCell change to the SN 121.

In some embodiments, the terminal device 110 may discard the stored SPCR information upon transmission of the SPCR information. For example, upon the terminal device 110 reports the SPCR information to the network device 120, the UE variable storing the SPCR information may be discarded.

In some embodiments, the terminal device 110 may release the stored information upon failure of the PSCell change. For example, if the PSCell change procedure finally failed, e.g., T304 of the SCG expires, the terminal device 110 may release the stored SPCR information for the corresponding procedure accordingly.

In some embodiments, the terminal device 110 may discard the stored information upon a predetermined period of time elapses since the information is stored. For example, the stored SPCR information may be discarded 48 hours since it is stored. Of course, the predetermined period of time may take any suitable values, and is not limited to this example.

In some embodiments, the terminal device 110 may discard the stored information upon receipt of an indication from the network side indicating that the information is discarded. For example, upon receipt of the availability of SPCR information, the node can indicate the terminal device 110 to discard the stored SPCR information. In some embodiments, the node may be any of the MN 122, the SN 121 and the further network device. In this way, management for a storage of the SPCR information can be optimized.

With the processes of FIGS. 2 to 5, the MRO function in NR could be enhanced to provide a more robust mobility via reporting failure events related information observed during successful PSCell change. A terminal device could be configured with triggering conditions to compile the successful PSCell change report, hence the report would be triggered only if the conditions are met. This limits UE reporting to relevant cases, such as underlying issues detected by RLM, or BFD detected upon a PSCell change event. The network device can request for the successful PSCell change report as needed. Upon reception of the successful PSCell change report, the network device is able to analyze whether its PSCell change configuration needs adjustment. The function of the successful PSCell change report can be applied to (NG) EN-DC, NE-DC and NR-DC.

Example Implementation of Methods

Accordingly, embodiments of the present disclosure provide methods of communication implemented at a terminal device and a network device. These methods will be described below with reference to FIGS. 6 and 7.

Figure 6:
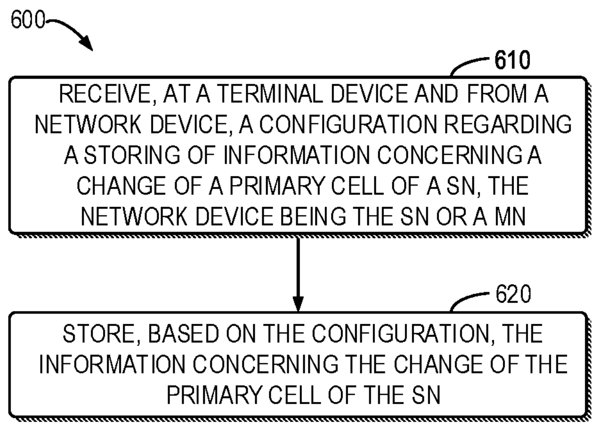
FIG. 6 illustrates an example method of communication implemented at a terminal device in accordance with some embodiments of the present disclosure.

FIG. 6 illustrates an example method 600 of communication implemented at a terminal device in accordance with some embodiments of the present disclosure. For example, the method 600 may be performed at the terminal device 110 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

At block 610, the terminal device 110 receives, from the network device 120, a configuration regarding a storing of information concerning a change of a primary cell of the SN 121 (i.e., PSCell change). In other words, the network device 120 can configure SPCR. In some embodiments, the network device 120 may be the SN 121. In some alternative embodiments, the network device 120 may be the MN 122. With the configuration, the support of SPCR associated with MN-initiated PSCell change and SN-initiated PSCell change is under network control.

In some embodiments, the terminal device 110 may receive the configuration in a RRC message from the SN 121. In some alternative embodiments, the terminal device 110 may receive the configuration in a RRC message from the MN 122. In some alternative embodiments, the terminal device 110 may receive the configuration in system information from the MN 122.

In some embodiments, the configuration may indicate whether the SPCR is supported. In some embodiments, the configuration may further comprise a condition for triggering the storing of the information. Of course, any other suitable information also may be comprised in the configuration as needed.

At block 620, the terminal device 110 stores, based on the configuration, the information concerning the change of the primary cell of the SN 121. In some embodiments, the terminal device 110 may determine whether a condition for triggering the storing of the information is satisfied, and store contents corresponding to the condition as the information if the condition is satisfied.

In some embodiments, the condition may be predefined. In these embodiments, the terminal device 110 may collect and store predefined contents about the PSCell change as the information. In some embodiments, the terminal device 110 may obtain the condition from the configuration. In these embodiments, the terminal device 110 may collect and store contents corresponding to the indicated condition as the information. In some embodiments, the indicated condition may be a portion of the predefined condition. In this way, signaling overhead and UE storage resource can be reduced.

In some embodiments, the condition may comprise a radio link problem of a first cell (i.e., source PSCell) from which the primary cell of the SN 121 is changed to a second cell (i.e., target PSCell). In these embodiments, the contents of the stored information may comprise at least one of the following: radio link problem rated parameters of the first cell; measurement result of the first cell, the second cell and neighboring cells upon the condition is satisfied; an identity of the first cell and an identity of the second cell; an identity of a primary cell of the MN 122; or an identifier of the terminal device in the first cell and the primary cell of the MN 122.

In some embodiments, the condition may comprise whether a plurality of candidate cells are configured for the second cell, for example, in case of CPC. In these embodiments, the contents of the stored information may comprise at least one of the following: identities of the plurality of candidate cells, measurement results of the plurality of candidate cells, or execution conditions of the plurality of candidate cells.

In some alternative embodiments, the condition may comprise whether a plurality of execution conditions are configured for the second cell, for example, in case of CPC. In these embodiments, the contents of the stored information may comprise contents of the satisfied execution condition.

In some embodiments, the terminal device 110 may store the information in a first IE of the terminal device 110 if the change is initiated by the SN 121, and store the information in a second IE of the terminal device 110 if the change is initiated by the MN 122. For example, the first IE and second IE may be different UE variables. Of course, any other suitable ways are also feasible.

In some embodiments, if the change is initiated by the SN 121, the terminal device 110 may store the information in association with a first indication indicating that the information is associated with the change initiated by the SN 121. If the change is initiated by the MN 122, the terminal device 110 may store the information in association with a second indication indicating that the information is associated with the change initiated by the MN 122. In this way, the stored SPCR information can be marked as MN-initiated or SN-initiated, so that the terminal device 110 and the network side can differentiate the SPCR information associated with MN-initiated PSCell change and the SPCR information associated with SN-initiated PSCell change.

In some embodiments, the terminal device 110 may transmit the stored information to the network device 120. In some embodiments, the terminal device 110 may transmit availability of the information to the network device 120, the information being associated with at least one of the change initiated by the SN 121 or the change initiated by the MN 122. Upon receipt of a request for obtaining the information from the network device 120, the terminal device 110 may transmit the information to the network device 120. Of course, any other suitable ways are also feasible for the transmission of the stored information.

In some embodiments, if the information is associated with the change initiated by the SN 121, the terminal device 110 may transmit the availability of the information to the SN 121. In some embodiments, if the information is associated with the change initiated by the MN 122, the terminal device 110 may transmit the availability of the information to the MN 122. In some embodiments, if the information is associated with the change initiated by the MN 122, the terminal device 110 may transmit, to the MN 122 or the SN 121, the availability of the information associated with the change initiated by the MN 122. In some embodiments, if the information is associated with the change initiated by the SN 121, the terminal device 110 may transmit, to the MN 122 or the SN 121, the availability of the information associated with the change initiated by the SN 121.

In some embodiments, the terminal device 110 may receive, from the MN 122 or the SN 121, the request for first part of the information associated with the change initiated by the SN 121. In some embodiments, the terminal device 110 may receive, from the MN 122 or the SN 121, the request for second part of the information associated with the change initiated by the MN 122.

In some embodiments, if the information is associated with the change initiated by the MN 122, the terminal device 110 may transmit the information to the MN 122. In some embodiments, if the information is associated with the change initiated by the SN 121, the terminal device 110 may transmit the information to the SN 121. In some embodiments, in response to receiving a request for first part of the information associated with the change initiated by the SN 121, the terminal device 110 may transmit the first part of the information to the MN 122 or the SN 121 transmitting the request. In some embodiments, in response to receiving a request for second part of the information associated with the change initiated by the MN 122, the terminal device 110 may transmit the second part of the information to the MN 122 or the SN 121 transmitting the request.

In some embodiments, the terminal device 110 may transmit availability of the information to the SN 121 via the MN 122, the information being associated with at least one of the change initiated by the SN 121 or the change initiated by the MN 122. In these embodiments, the terminal device 110 may receive, via the MN 122, a request for obtaining the information from the SN 121, and transmit the information to the SN 121 via the MN 122.

In some embodiments, if the information is associated with the change initiated by the SN 121, the terminal device 110 may transmit, via the MN 122, the availability of the information to the SN 121. In some embodiments, if the information is associated with the change initiated by the MN 122, the terminal device 110 may transmit, via the MN 122 and to the SN 121, the availability of first part of the information associated with the change initiated by the MN 122. In some embodiments, if the information is associated with the change initiated by the SN 121, the terminal device 110 may transmit, via the MN 122 and to the SN 121, the availability of second part of the information associated with the change initiated by the SN 121.

In some embodiments, the terminal device 110 may receive, via the MN 122 and from the SN 121, the request for first part of the information associated with the change initiated by the SN 121. In some embodiments, the terminal device 110 may receive, via the MN 122 and from the SN 121, the request for second part of the information associated with the change initiated by the MN 122.

In some embodiments, if the information is associated with the change initiated by the SN 121, the terminal device 110 may transmit the information to the SN 121 via the MN 122. In some embodiments, in response to receiving a request for first part of the information from the SN 121 via the MN 122, the terminal device 110 may transmit the first part of the information to the SN 121 via the MN 122. In some embodiments, in response to receiving a request for second part of the information from the SN 121 via the MN 122, the terminal device 110 may transmit the second part of the information to the SN 121 via the MN 122.

In some embodiments, if the MN 122 is changed from the network device 120 to a further network device (i.e., target PCell), the terminal device 110 may transmit availability of the stored information to the further network device. In other words, upon establishment or reestablishment or handover of the MN 122, the terminal device 110 may transmit the availability of the stored information to the target PCell. During the establishment or reestablishment, the target PCell may be the source PCell. In some embodiments, the stored information may be associated with PSCell change initiated by the source PCell or the source PSCell.

In some embodiments, upon receipt of a request for obtaining the stored information from the further network device, the terminal device 110 may transmit the requested information to the further network device. In some embodiments, the further network device may forward the requested information to the source PCell or the source PSCell. In some embodiments, the further network device may forward the SPCR information associated with SN-initiated PSCell change to the source PCell so that the source PCell forwards the SPCR information associated with SN-initiated PSCell change to the source PSCell. In some embodiments, the further network device may forward the SPCR information associated with SN-initiated PSCell change to the source PSCell if there is an interface between them. In this way, a very flexible SPCR reporting mechanism is provided.

In some embodiments, the terminal device 110 may discard the stored information upon transmission of the information. In some embodiments, the terminal device 110 may release the stored information upon failure of the PSCell change. In some embodiments, the terminal device 110 may discard the stored information upon a predetermined period of time elapses since the information is stored. In some embodiments, the terminal device 110 may discard the stored information upon receipt of an indication from the node, the indication indicating that the information is discarded. In this way, management for a storage of the SPCR information can be optimized.

Figure 7:
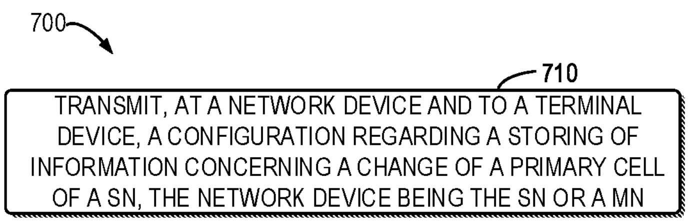
FIG. 7 illustrates an example method of communication implemented at a network device in accordance with some embodiments of the present disclosure.

FIG. 7 illustrates an example method 700 of communication implemented at a network device in accordance with some embodiments of the present disclosure. For example, the method 700 may be performed at the network device 120 as shown in FIG. 1. The network device 120 may be the MN 122 or the SN 121. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the network device 120 transmits, to the terminal device 110, a configuration regarding a storing of information concerning a change of a primary cell of the SN 121. In some embodiments, the network device 120 may be the MN 122. In some alternative embodiments, the network device 120 may be the SN 121.

In some embodiments where the network device 120 is the MN 122, the MN 122 may transmit the configuration in a RRC message to the terminal device 110. Alternatively, the MN 122 may transmit the configuration in system information to the terminal device 110. In some embodiments where the network device 120 is the SN 121, the SN 121 may transmit the configuration in a RRC message to the terminal device 110.

In some embodiments, the configuration may comprise a condition for triggering the storing of the information. In some embodiments, the condition may comprise a radio link problem of a first cell from which the primary cell of the secondary node is changed to a second cell, and contents of the information corresponding to the condition may comprise at least one of the following: radio link problem rated parameters of the first cell; measurement result of the first cell, the second cell and neighboring cells upon the condition is satisfied; an identity of the first cell and an identity of the second cell; an identity of a primary cell of the master node; or an identifier of the terminal device in the first cell and the primary cell of the master node.

In some embodiments, the condition may comprise whether a plurality of candidate cells are configured for a second cell to which the primary cell of the secondary node is changed from a first cell, and contents of the information corresponding to the condition may comprise at least one of the following: identities of the plurality of candidate cells, measurement results of the plurality of candidate cells, or execution conditions of the plurality of candidate cells.

In some embodiments, the condition may comprise whether a plurality of execution conditions are configured for a second cell to which the primary cell of the secondary node is changed from a first cell, and contents of the information corresponding to the condition may comprise contents of the satisfied execution condition.

In some embodiments, the network device 120 may receive, from the terminal device 110, the information concerning the change of the primary cell of the SN 121. In some embodiments, the network device 120 may receive availability of the information from the terminal device 110, the information being associated with at least one of the change initiated by the SN 121 or the change initiated by the MN 122. In these embodiments, the network device 120 may transmit a request for obtaining the information to the terminal device 110, and receive the requested information from the terminal device 110.

In some embodiments where the network device 120 is the MN 122, the MN 122 may receive the availability of the information transmitted by the terminal device 110 in accordance with a determination that the change is initiated by the MN 122. In some embodiments where the network device 120 is the SN 121, the SN 121 may receive the availability of the information transmitted by the terminal device 110 in accordance with a determination that the change is initiated by the SN 121. In some embodiments where the network device 120 is the SN 121, the SN 121 may receive the availability of the information transmitted by the terminal device 110 in accordance with a determination that the change is initiated by the SN 121. In some embodiments, the SN 121 or the MN 122 may receive the availability of the information associated with the change initiated by the MN 122. In some embodiments, the SN 121 or the MN 122 may receive the availability of the information associated with the change initiated by the SN 121.

In some embodiments, the SN 121 or the MN 122 may transmit, to the terminal device 110, the request for first part of the information associated with the change initiated by the SN 121. In some embodiments, the SN 121 or the MN 122 may transmit, to the terminal device 110, the request for second part of the information associated with the change initiated by the MN 122.

In some embodiments where the network device 120 is the MN 122, the MN 122 may receive the information associated with the change initiated by the MN 122. In some embodiments where the network device 120 is the SN 121, the SN 121 may receive the information associated with the change initiated by the SN 121. In some embodiments, the SN 121 may receive first part of the information transmitted by the terminal device 110 in accordance with a request for the first part of the information from the SN 121, the first part being associated with the change initiated by the SN 121. In some embodiments, the MN 122 may receive first part of the information transmitted by the terminal device 110 in accordance with a request for the first part of the information from the MN 122, the first part being associated with the change initiated by the SN 121.

In some embodiments, the SN 121 may receive second part of the information transmitted by the terminal device 110 in accordance with a request for the second part of the information from the SN 121, the second part being associated with the change initiated by the MN 122. In some embodiments, the MN 122 may receive second part of the information transmitted by the terminal device 110 in accordance with a request for the second part of the information from the MN 122, the second part being associated with the change initiated by the MN 122.

In some embodiments where the network device 120 is the MN 122, in response to receiving availability of first part of the information from the terminal device 110, the first part being associated with the change initiated by the SN 121, the MN 122 may forward the availability of the first part of the information to the SN 121. In some embodiments where the network device 120 is the MN 122, in response to receiving the first part of the information from the terminal device 110, the MN 122 may forward the first part of the information to the SN 121.

In some embodiments where the network device 120 is the SN 121, in response to receiving availability of second part of the information from the terminal device 110, the second part being associated with the change initiated by the MN 122, the SN 121 may forward the availability of the second part of the information to the MN 122. In some embodiments where the network device 120 is the SN 121, in response to receiving the second part of the information from the terminal device 110, the SN 121 may forward the second part of the information to the MN 122.

In some embodiments where the network device 120 is the SN 121, the SN 121 may receive, via the MN 122, availability of the information from the terminal device 110, the information being associated with at least one of the change initiated by the SN 121 or the change initiated by the MN 122. In these embodiments, the SN 121 may transmit, via the MN 122, a request for obtaining the information to the terminal device 110, and receive, via the MN 122, the information from the terminal device 110.

In some embodiments where the network device 120 is the MN 122, the MN 122 may receive the information from the terminal device 110 via a further network device, the further network device being a network device upon reestablishment or handover of the MN 122, the information being associated with at least one of the change initiated by the SN 121 or the change initiated by the MN 122.

In this way, the network device can obtain expected SPCR information and use the SPCR information to analyse whether its PSCell change configuration needs adjustment.

Example Implementation of Device

Figure 8:
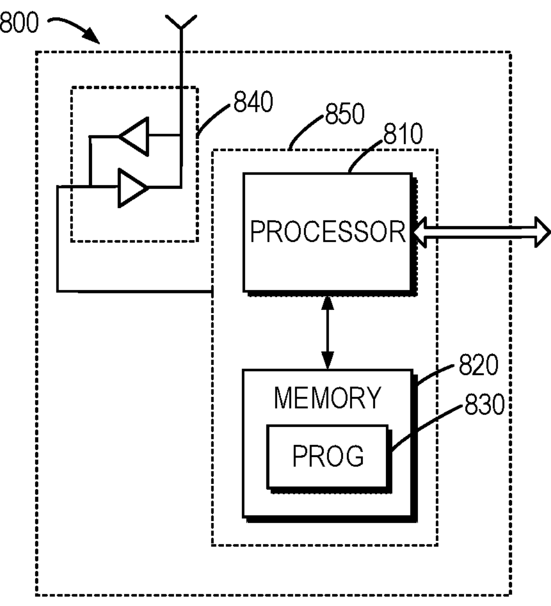
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the terminal device 110 or the network device 120 as shown in FIG. 1. Accordingly, the device 800 can be implemented at or as at least a part of the terminal device 110 or the network device 120.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, SI/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology; such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

In some embodiments, a terminal device comprises circuitry configured to: receive, from a network device, a configuration regarding a storing of information concerning a change of a primary cell of a secondary node, the network device being the secondary node or a master node; and store, based on the configuration, the information concerning the change of the primary cell of the secondary node.

In some embodiments, the circuitry may be configured to receive the configuration by at least one of the following: receiving the configuration in a RRC message from the secondary node; receiving the configuration in a RRC message from the master node; or receiving the configuration in system information from the master node.

In some embodiments, the circuitry may be configured to store the information by determining whether a condition for triggering the storing of the information is satisfied; and in accordance with a determination that the condition is satisfied, storing contents corresponding to the condition as the information. In some embodiments, the circuitry may be further configured to obtain the condition from the configuration.

In some embodiments, the condition may comprise a radio link problem of a first cell from which the primary cell of the secondary node is changed to a second cell, and the contents may comprise at least one of the following: radio link problem rated parameters of the first cell; measurement result of the first cell, the second cell and neighboring cells upon the condition is satisfied; an identity of the first cell and an identity of the second cell; an identity of a primary cell of the master node; or an identifier of the terminal device in the first cell and the primary cell of the master node.

In some embodiments, the condition may comprise whether a plurality of candidate cells are configured for a second cell to which the primary cell of the secondary node is changed from a first cell, and the contents may comprise at least one of the following: identities of the plurality of candidate cells, measurement results of the plurality of candidate cells, or execution conditions of the plurality of candidate cells.

In some embodiments, the condition may comprise whether a plurality of execution conditions are configured for a second cell to which the primary cell of the secondary node is changed from a first cell, and the contents may comprise contents of the satisfied execution condition.

In some embodiments, the circuitry may be configured to store the information by storing the information in a first information element of the terminal device in accordance with a determination that the change is initiated by the secondary node; and storing the information in a second information element of the terminal device in accordance with a determination that the change is initiated by the master node.

In some embodiments, the circuitry may be configured to store the information by storing the information in association with a first indication indicating that the information is associated with the change initiated by the secondary node in accordance with a determination that the change is initiated by the secondary node; and storing the information in association with a second indication indicating that the information is associated with the change initiated by the master node in accordance with a determination that the change is initiated by the master node.

In some embodiments, the circuitry may be further configured to at least one of the following: discard the stored information upon transmission of the information; release the stored information upon failure of the change; discard the stored information upon a predetermined period of time elapses; or discard the stored information upon receipt of an indication from the network device, the indication indicating that the information is discarded.

In some embodiments, the circuitry may be further configured to transmit the information to the network device. In some embodiments, the circuitry may be configured to transmit the information by: transmitting availability of the information to the network device, the information being associated with at least one of the change initiated by the secondary node or the change initiated by the master node; receiving a request for obtaining the information from the network device; and transmitting the information to the network device.

In some embodiments, the circuitry may be configured to transmit the availability of the information by at least one of the following: in accordance with a determination that the information is associated with the change initiated by the secondary node, transmitting the availability of the information to the secondary node; in accordance with a determination that the information is associated with the change initiated by the master node, transmitting the availability of the information to the master node; in accordance with a determination that the information is associated with the change initiated by the master node, transmitting, to the network device, the availability of the information associated with the change initiated by the master node; or in accordance with a determination that the information is associated with the change initiated by the secondary node, transmitting, to the network device, the availability of the information associated with the change initiated by the secondary node.

In some embodiments, the circuitry may be configured to receive the request by at least one of the following: receiving, from the network device, the request for first part of the information associated with the change initiated by the secondary node; or receiving, from the network device, the request for second part of the information associated with the change initiated by the master node.

In some embodiments, the circuitry may be configured to transmit the information comprises at least one of the following: in accordance with a determination that the information is associated with the change initiated by the master node, transmitting the information to the master node; in accordance with a determination that the information is associated with the change initiated by the secondary node, transmitting the information to the secondary node; in response to receiving a request for first part of the information from the network device, transmitting the first part of the information to the network device, the first part being associated with the change initiated by the secondary node; or in response to receiving a request for second part of the information from the network device, transmitting the second part of the information to the network device, the second part being associated with the change initiated by the master node.

In some embodiments, the circuitry may be configured to transmit the information by transmitting, via the master node, availability of the information to the secondary node, the information being associated with at least one of the change initiated by the secondary node or the change initiated by the master node; receiving, via the master node, a request for obtaining the information from the secondary node; and transmitting, via the master node, the information to the secondary node.

In some embodiments, the circuitry may be configured to transmit the availability of the information comprises at least one of the following: in accordance with a determination that the information is associated with the change initiated by the secondary node, transmitting, via the master node, the availability of the information to the secondary node; in accordance with a determination that the information is associated with the change initiated by the master node, transmitting, via the master node, the availability of the information associated with the change initiated by the master node; or in accordance with a determination that the information is associated with the change initiated by the secondary node, transmitting, via the master node, the availability of the information associated with the change initiated by the secondary node.

In some embodiments, the circuitry may be configured to receive the request by at least one of the following: receive, via the master node and from the secondary node, the request for first part of the information associated with the change initiated by the secondary node; or receiving, via the master node and from the secondary node, the request for second part of the information associated with the change initiated by the master node.

In some embodiments, the circuitry may be configured to transmit the information comprises at least one of the following: in accordance with a determination that the information is associated with the change initiated by the secondary node, transmitting the information to the secondary node via the master node; in response to receiving a request for first part of the information from the secondary node via the master node, transmitting the first part of the information to the secondary node via the master node; or in response to receiving a request for second part of the information from the secondary node via the master node, transmitting the second part of the information to the secondary node via the master node.

In some embodiments, the circuitry may be configured to transmit the information by transmitting availability of the information to a further network device, the further network device being a network device upon reestablishment or handover of the master node; receiving a request for obtaining the information from the further network device; and transmitting the information to the further network device for forwarding to the network device.

In some embodiments, a network device comprises circuitry configured to: transmit, to a terminal device, a configuration regarding a storing of information concerning a change of a primary cell of a secondary node, the network device being the secondary node or a master node.

In some embodiments where the network device is the master node, the circuitry is configured to transmit the configuration by at least one of the following: transmitting the configuration in a RRC message to the terminal device; or transmitting the configuration in system information to the terminal device.

In some embodiments where the network device is the secondary node, the circuitry is configured to transmit the configuration by transmitting the configuration to the terminal device in a RRC message.

In some embodiments, the configuration may comprise a condition for triggering the storing of the information. In some embodiments, the condition may comprise a radio link problem of a first cell from which the primary cell of the secondary node is changed to a second cell, and contents of the information corresponding to the condition may comprise at least one of the following: radio link problem rated parameters of the first cell; measurement result of the first cell, the second cell and neighboring cells upon the condition is satisfied; an identity of the first cell and an identity of the second cell; an identity of a primary cell of the master node; or an identifier of the terminal device in the first cell and the primary cell of the master node.

In some embodiments, the condition may comprise whether a plurality of candidate cells are configured for a second cell to which the primary cell of the secondary node is changed from a first cell, and contents of the information corresponding to the condition may comprise at least one of the following: identities of the plurality of candidate cells, measurement results of the plurality of candidate cells, or execution conditions of the plurality of candidate cells. In some embodiments, the condition may comprises whether a plurality of execution conditions are configured for a second cell to which the primary cell of the secondary node is changed from a first cell, and contents of the information corresponding to the condition may comprise contents of the satisfied execution condition.

In some embodiments, the circuitry may be further configured to receive, from the terminal device, the information concerning the change of the primary cell of the secondary node. In some embodiments, the circuitry may be configured to receive the information by receiving availability of the information from the terminal device, the information being associated with at least one of the change initiated by the secondary node or the change initiated by the master node; transmitting a request for obtaining the information to the terminal device; and receiving the information from the terminal device.

In some embodiments, the circuitry may be configured to receive the availability of the information by at least one of the following: receiving, at the network device being the master node, the availability of the information transmitted by the terminal device in accordance with a determination that the change is initiated by the master node; receiving, at the network device being the secondary node, the availability of the information transmitted by the terminal device in accordance with a determination that the change is initiated by the secondary node; receiving the availability of the information associated with the change initiated by the master node; or receiving the availability of the information associated with the change initiated by the secondary node.

In some embodiments, the circuitry may be configured to transmit the request by at least one of the following: transmitting, to the terminal device, the request for first part of the information associated with the change initiated by the secondary node; or transmitting, to the terminal device, the request for second part of the information associated with the change initiated by the master node.

In some embodiments, the circuitry may be configured to receive the information by receiving, at the network device being master mode, the information associated with the change initiated by the master node; receiving, at the network device being secondary mode, the information associated with the change initiated by the secondary node; receiving first part of the information transmitted by the terminal device in accordance with a request for the first part of the information from the network device, the first part being associated with the change initiated by the secondary node; or receiving second part of the information transmitted by the terminal device in accordance with a request for the second part of the information from the network device, the second part being associated with the change initiated by the master node.

In some embodiments where the network device is the master node, the circuitry may be further configured to at least one of the following: in response to receiving availability of first part of the information from the terminal device, the first part being associated with the change initiated by the secondary node, forward the availability of the first part of the information to the secondary node; or in response to receiving the first part of the information from the terminal device, forward the first part of the information to the secondary node.

In some embodiments where the network device is the secondary node, the circuitry may be further configured to at least one of the following: in response to receiving availability of second part of the information from the terminal device, the second part being associated with the change initiated by the master node, forward the availability of the second part of the information to the master node; or in response to receiving the second part of the information from the terminal device, forward the second part of the information to the mater node.

In some embodiments where the network device is the secondary node, the circuitry may be configured to receive the information by: receiving, via the master node, availability of the information from the terminal device, the information being associated with at least one of the change initiated by the secondary node or the change initiated by the master node; transmitting, via the master node, a request for obtaining the information to the terminal device; and receiving, via the master node, the information from the terminal device.

In some embodiments, the circuitry may be configured to receive the information by: receiving the information from the terminal device via a further network device, the further network device being a network device upon reestablishment or handover of the master node, the information being associated with at least one of the change initiated by the secondary node or the change initiated by the master node.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, comprising:

receiving, from a network device, a configuration for the terminal device to report a successful change of a primary cell of a secondary cell group (PSCell change) configured by the network device; and storing information on the successful PSCell change, in response to a trigger condition for reporting the successful PSCell change being satisfied based on the configuration, wherein the information on the successful PSCell change comprises:

an identity (ID) of a primary cell (PCell);

an ID of a source PSCell;

a measurement result of a source PSCell;

an ID of a target PSCell;

a measurement result of a target PSCell;

measurement results of neighboring cells;

indication indicating whether the information is for SN initiated PSCell change or not; and information associated with a timer, the timer being associated with the source PSCell.

2. The method of claim 1, wherein the network device is a secondary node (SN) or a master node (MN).

3. The method of claim 2, further comprising transmitting, to the SN, availability of the information on the successful PSCell change in a radio resource control (RRC) reconfiguration complete message by signaling radio bearer 3 (SRB3).

4. The method of claim 2, further comprising:

receiving a request for the information on the successful PSCell change in a user equipment (UE) information request message; and reporting the information on the successful PSCell change in a UE information response message.

5. The method of claim 4, wherein, receiving the request comprises receiving the request from the MN, and reporting the information on the successful PSCell change comprises reporting the information on the successful PSCell change to the MN; or receiving the request comprises receiving the request from a further network device different from the MN, and reporting the information on the successful PSCell change comprises reporting the information on the successful PSCell change to the further network device.

6. The method of claim 5, further comprising transmitting availability of the information on the successful PSCell change in one of a RRC setup complete message, a RRC resume complete message, and a RRC reestablishment complete message.

7. A method performed by a network device, comprising:

transmitting a configuration for a terminal device to report a successful change of a primary cell of a secondary cell group (PSCell change) configured by the network device; and receiving information on the successful PSCell change in response to a trigger condition for reporting the successful PSCell change being satisfied based on the configuration, wherein the information on the successful PSCell change comprises:

an identity (ID) of a primary cell (PCell);

an ID of a source PSCell;

a measurement result of a source PSCell;

an ID of a target PSCell;

a measurement result of a target PSCell;

measurement results of neighboring cells;

indication indicating whether the information is for SN initiated PSCell change or not; and information associated with a timer, the timer being associated with the source PSCell.

8. The method of claim 7, wherein the network device is a secondary node (SN) or a master node (MN).

9. The method of claim 8, further comprising receiving, by the SN, availability of the information on the successful PSCell change in a radio resource control (RRC) reconfiguration complete message by signaling radio bearer 3 (SRB3).

10. The method of claim 9, further comprising transmitting, by the SN, the availability of the information on the successful PSCell change to the MN.

11. The method of claim 9, further comprising:

transmitting a request for the information on the successful PSCell change in a user equipment (UE) information request message; and receiving the information on the successful PSCell change in a UE information response message.

12. The method of claim 11, wherein, transmitting the request comprises transmitting the request by the MN, and receiving the information on the successful PSCell change comprises receiving the information on the successful PSCell change by the MN; or transmitting the request comprises transmitting the request by a further network device different from the MN, and receiving the information on the successful PSCell change comprises receiving the information on the successful PSCell change by the further network device.

13. The method of claim 12, further comprising, in a case where the information on the successful PSCell change is received by the further network device, receiving the information on the successful PSCell change by the MN from the further network device and forwarding the information on the successful PSCell change to the SN.

14. The method of claim 7, wherein the trigger condition is associated with the timer, and wherein the timer comprises T310 or T312.

15. The method of claim 14, wherein the timer is associated with a radio link problem.

16. A terminal device comprising a processor configured to cause the terminal device to:

receive, from a network device, a configuration for the terminal device to report a successful change of a primary cell of a secondary cell group (PSCell change) configured by the network device; and store information on the successful PSCell change, in response to a trigger condition for reporting the successful PSCell change being satisfied based on the configuration, wherein the information on the successful PSCell change comprises:

an identity (ID) of a primary cell (PCell);

an ID of a source PSCell;

a measurement result of a source PSCell;

an ID of a target PSCell;

a measurement result of a target PSCell;

measurement results of neighboring cells;

indication indicating whether the information is for SN initiated PSCell change or not; and information associated with a timer, the timer being associated with the source PSCell.

17. The terminal device of claim 16, wherein the network device is a secondary node- or a master node (MN).

18. The terminal device of claim 17, the processor is further configured to cause the terminal device to transmit, to the SN, availability of the information on the successful PSCell change in a radio resource control (RRC) reconfiguration complete message by signaling radio bearer 3 (SRB3).

19. The terminal device of claim 17, the processor is further configured to cause the terminal device to:

receive a request for the information on the successful PSCell change in a user equipment (UE) information request message; and report the information on the successful PSCell change in a UE information response message.

20. The terminal device of claim 19, wherein the terminal device is caused to receive the request by receiving the request from the MN, and report the information on the successful PSCell change by reporting the information on the successful PSCell change to the MN; or the terminal device is caused to receive the request by receiving the request from a further network device different from the MN, and report the information on the successful PSCell change by reporting the information on the successful PSCell change to the further network device.

21. The terminal device of claim 20, the processor is further configured to cause the terminal device to transmit availability of the information on the successful PSCell change in one of a RRC setup complete message, a RRC resume complete message, and a RRC reestablishment complete message.

22. A network device comprising a processor configured to cause the network device to:

transmit a configuration for a terminal device to report a successful change of a primary cell of a secondary cell group (PSCell change) configured by the network device; and receive information on the successful PSCell change in response to a trigger condition for reporting the successful PSCell change being satisfied based on the configuration, wherein the information on the successful PSCell change comprises:

an identity (ID) of a primary cell (PCell);

an ID of a source PSCell;

a measurement result of a source PSCell;

an ID of a target PSCell;

a measurement result of a target PSCell;

measurement results of neighboring cells;

indication indicating whether the information is for SN initiated PSCell change or not; and information associated with a timer, the timer being associated with the source PSCell.

23. The network device of claim 22, wherein the network device is a secondary node—(SN) or a master node (MN).

24. The network device of claim 23, the processor is further configured to cause the network device to receive, by the SN, availability of the information on the successful PSCell change in a radio resource control (RRC) reconfiguration complete message by signaling radio bearer 3 (SRB3).

25. The network device of claim 24, the processor is further configured to cause the network device to transmit, by the SN, the availability of the information on the successful PSCell change to the MN.

26. The network device of claim 24, the processor is further configured to cause the network device to:

transmit a request for the information on the successful PSCell change in a user equipment (UE) information request message; and receive the information on the successful PSCell change in a UE information response message.

27. The network device of claim 26, wherein the network device is caused to transmit the request by transmitting the request by the MN, and to receive the information on the successful PSCell change by receiving the information on the successful PSCell change by the MN; or the network device is caused to transmit the request by transmitting the request by a further network device different from the MN, and to receive the information on the successful PSCell change by receiving the information on the successful PSCell change by the further network device.

28. The network device of claim 27, wherein in a case where the information on the successful PSCell change is received by the further network device, the processor is further configured to cause the network device to receive the information on the successful PSCell change by the MN from the further network device and forward the information on the successful PSCell change to the SN.

29. The method of claim 1, wherein the trigger condition is associated with the timer, wherein the timer comprises T310 or T312.

30. The method of claim 29, wherein the timer is associated with a radio link problem.

* * * * *